C. SMART.
GANG PLOW.
APPLICATION FILED MAY 4, 1909.
933,858.
Patented Sept. 14, 1909.
4 SHEETS—SHEET 2.
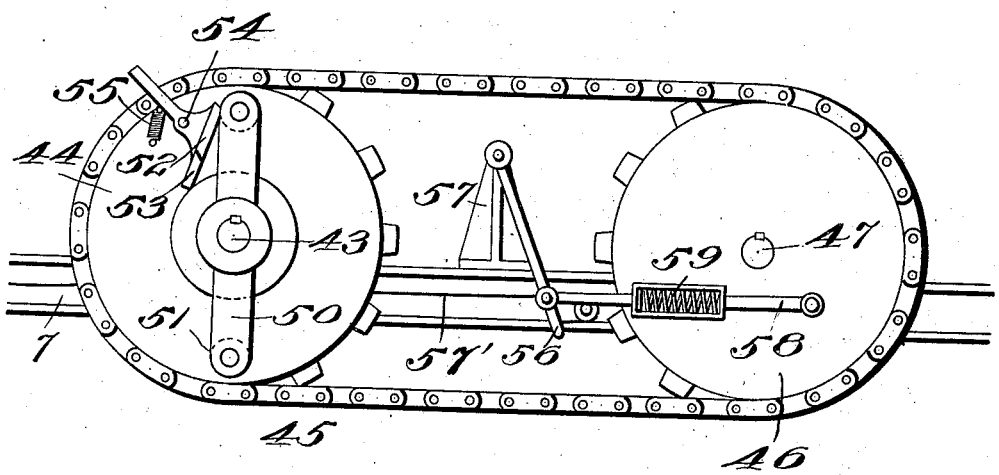
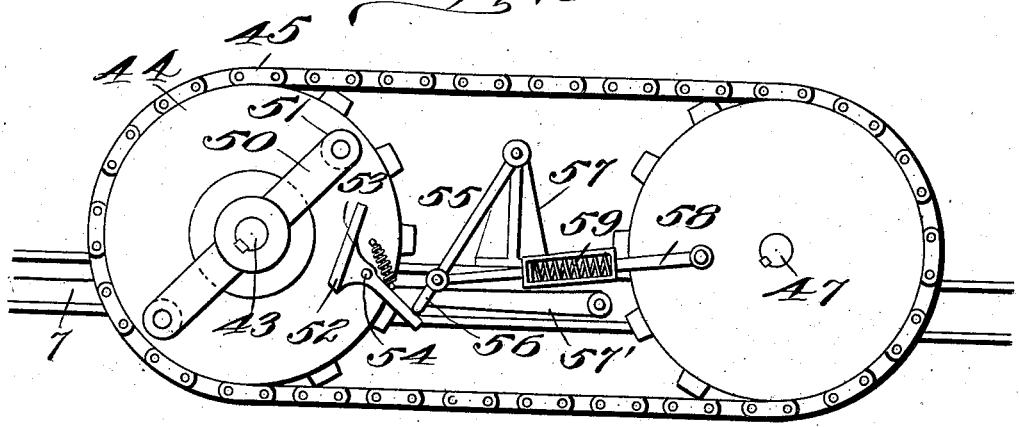
Witnesses
Inventor
Charles Smart
By
Attorney

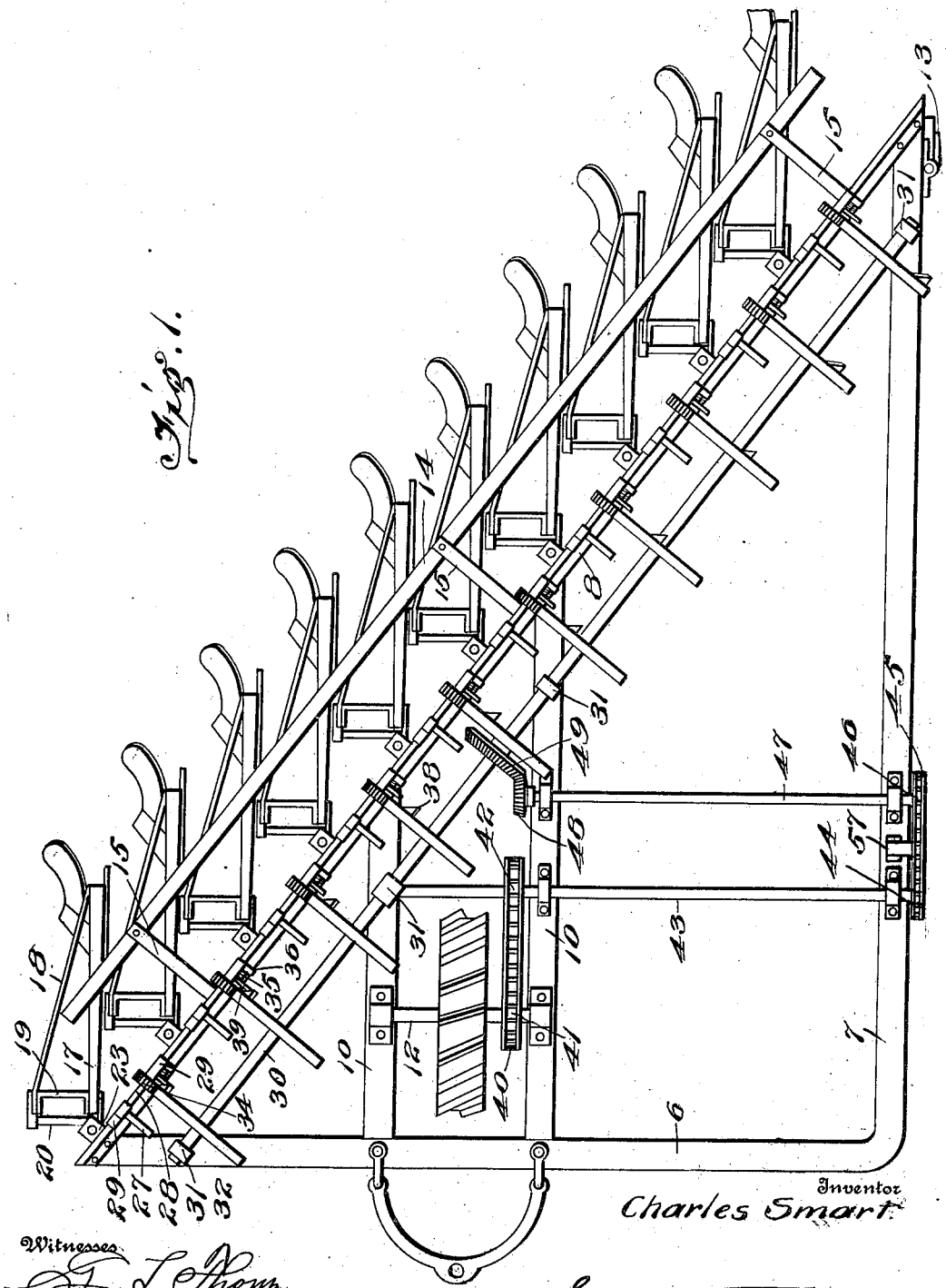

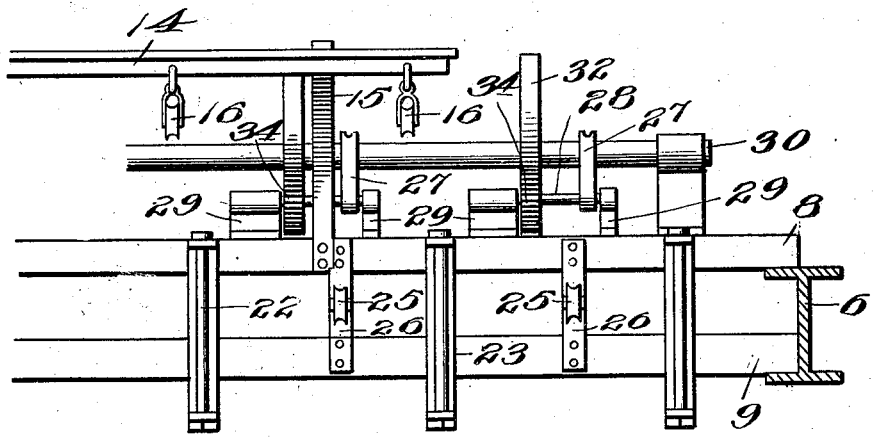
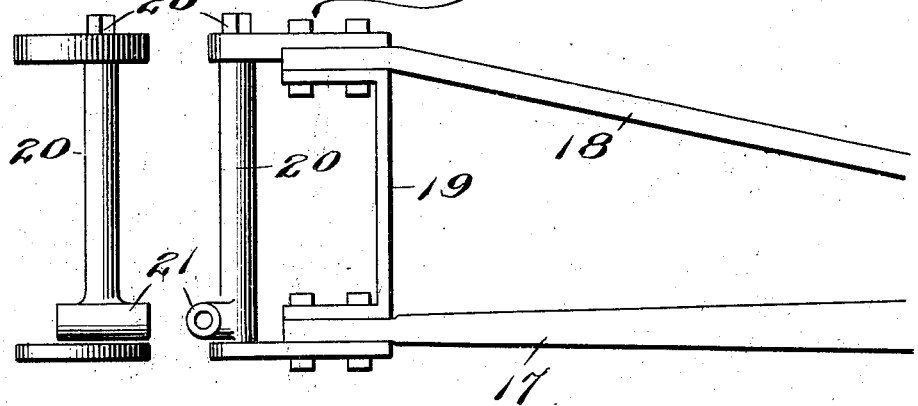

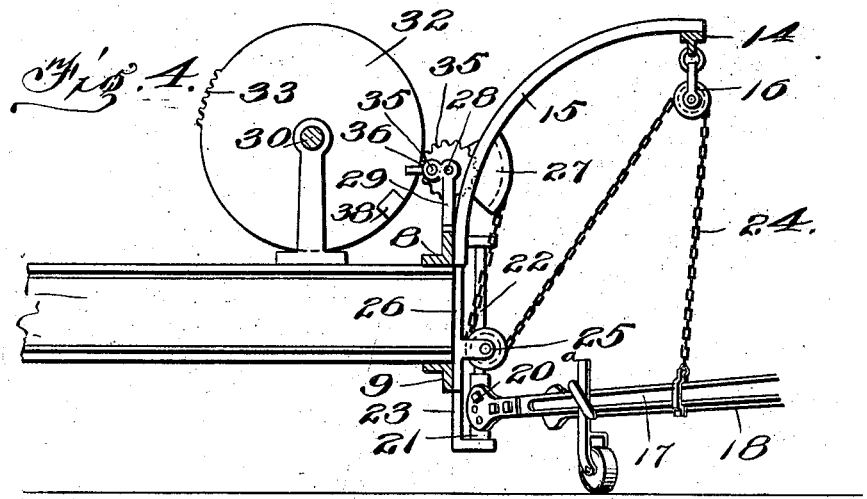

UNITED STATES PATENT OFFICE.

CHARLES SMART, OF HENDRUM, MINNESOTA.

GANG-PLOW.

933,858. Specification of Letters Patent. Patented Sept. 14, 1909.

Application filed May 4, 1909. Serial No. 493,927.

*To all whom it may concern:*

Be it known that I, CHARLES SMART, citizen of the United States, residing at Hendrum, in the county of Norman and State of Minnesota, have invented certain new and useful Improvements in Gang-Plows, of which the following is a specification.

This invention relates to gang plows of that type adapted and intended to be hauled by traction engines.

An object of the invention is to provide improved means for attaching the gang or series of plows to a triangular frame, so as to allow the individual plows to respectively conform to the unevenness of the ground.

A further object of the invention is to provide improved devices for connecting the respective plows to the frame in such manner that they will not tip over, but will nevertheless be allowed two motions, that is, vertical movement and horizontal swing.

A further object of the invention is to provide improved means for lifting and lowering the plows in succession. Since the plow units are connected to the frame on a diagonal line, it is necessary or desirable that the plows be lifted in succession, with sufficient difference in time of operation to bring the furrows even at the ends thereof; and it is also desirable that the plows be lowered in succession, so that the furrows may start evenly. By devices hereinafter shown and described these results are accomplished, the construction embodying mutilated gears the teeth of which respectively engage, in succession, pinions which operate hoisting devices connected to the respective plows. And in order to let the plows down in succession, each of the mutilated gear wheels is provided with a releasing device, and said devices operate in turn to release the successive hoisting devices by which the plows are held in raised position, thereby allowing said plows to drop in succession. The gears and other devices are proportioned to the distance apart of the plows, that is, the distance of one behind the other along the line of draft, in order that the desired result, above referred to, may be effected.

A further object of the invention is to provide an improved trip mechanism for operating the hoisting devices above referred to, said trip mechanism being under the control of the operator or driver, the power to hoist the plow units being derived from the main carrying or driving wheel of the plow.

With these and other objects in view the invention is illustrated in the accompanying drawings in which—

Figure 1 is a plan view of the plow. Fig. 2 is a partial side elevation showing the tripping devices. Fig. 3 is a partial rear elevation looking at a right angle to the diagonal part of the frame, and with the plow units removed. Fig. 4 is a sectional view showing the hoisting devices for one of the plows, said plow being in lowered position. Fig. 5 is a similar view showing the hoisting mechanism from the opposite side, the plow being in raised position. Figs. 6 and 7 are details of the plow beam and the casting for connecting the same to the clevis. Fig. 8 is a side view similar to Fig. 2, but with the tripping device in different position.

Referring specifically to the drawings, the main frame consists of a front cross bar 6, a left side bar 7 and diagonal upper and lower bars 8 and 9, with longitudinal connecting bar 10 between the front and diagonal bars, the latter being carried upon the axle of the main wheel 12 which is located at the center of the line of draft. The front and side bars are preferably double T beams of structural steel, the diagonal bars 8 and 9 are preferably angle bars of the necessary strength. These bars and beams are bolted together to form the triangular frame. A caster wheel 13 is provided at the rear corner to assist in supporting the frame.

The plow units forming the gang are attached along the diagonal bars, and above the plow units is located a diagonal beam 14, supported by curved overhanging standards 15 rising from the diagonal bars 8 and 9. The upper hoisting pulleys 16 are hung from the bar 14. Each of the plow units is connected to the diagonal beams of the frame by devices now to be described. Each plow unit is provided with a main beam 17 and a side or wing beam 18, the latter springing from the bend of the main beam and extending forwardly beside the same, and at the front ends the said beams are connected by a cross brace 19. They are also connected to a tubular casting 20 by means of a bolt 20ª which extends horizontally, and the casting has on its front side a vertical sleeve 21, located in line with the front end of the main beam 17, and this sleeve fits and is slidable up and down on the vertical clevis bolt 22 which is supported at top and bottom by a hanger or bracket 23 bolted to the diagonal bars 8 and 9. When the plow is raised or lowered the sleeve 21 slides up and down on the bolt. The clevis connection as described also allows the plow to swing laterally to a limited extent. The attachments described are individual to each of the plow units, and accordingly each plow unit may be raised or lowered independently.

The hoisting devices for each plow are shown particularly in Figs. 1, 4 and 5. A chain 24 is connected to the plow beam and extends thence substantially vertically to the pulley 16, over which it passes and extends thence downwardly and over a pulley 25 set in a bracket 26 projecting from one side of the hanger 23, and thence the chain extends upwardly and is connected to a segment 27. There is one of these segments for each plow and each one is mounted on a short shaft 28 supported by brackets 29 on the angle bar 8, and when each shaft is turned the corresponding plow will be raised or lowered accordingly, or rather, when the shaft is turned in one direction the plow will be raised, and when the shaft is released the plow will drop by its own weight and return the shaft.

In order to operate the shafts 28 in succession to lift the plow units, and also to release the same in succession to drop the plow shares or units, a long diagonal shaft 30 is provided, suitably mounted upon upright brackets 31 which stand on the beams of the main frame, the shaft being parallel to, above, and in front of the diagonal beams 8 and 9. The shaft 30 has thereon a series of wheels 32 corresponding in number to the plow units, and each of these wheels 32 has a segment of teeth 33 arranged to engage a pinion 34 on the shaft 28, and when said wheels are rotated and the cogs are engaged with the pinions the latter will be turned, thereby turning the shaft 28 and hoisting the plow unit. In order to hold the plow in lifted position until released a spring pin 35 is provided which slides in guides 36 projecting from one of the bearing brackets 29, and this pin 35 is arranged to engage in a hole 37 in the adjacent side of the pinion 34, thereby locking said pinion. To release the pinion and allow the plow unit to drop, each wheel 32 has a cam 38 located diametrically opposite the cogs 33 and on the side of the wheel adjacent to the pin 35, and said pin has a lug 39 which projects into the path of the cam, and when the cam comes around it presses against said lug and forces back the pin, withdrawing the same from the hole 37, thereby allowing the pinion and shaft 28 to turn and the plow unit to drop to the ground.

The teeth 33 on the several wheels 32 are located in succession with respect to angular position so that they will operate successively, beginning at the foremost plow and so on down the line of plows, and the teeth are so proportioned that they would form, if all wheels were consolidated, a half circle. The number of teeth on the respective wheels and the proportions of the respective pinions, are worked out according to the number of plow units and the distance apart of the plow units in the line of draft, so that the ends of the furrows will be in line when all the plows are lifted. When the shaft 30 is turned by devices to be described the teeth of the first wheel pick up the first pinion and turn the same and the first plow is lifted. The teeth of the next wheel then pick up the second shaft and the second plow is lifted, and so on down the line of plows until all are lifted, and as each plow is lifted the corresponding pin 35 catches the pinion 34 and locks the plow in raised position.

In order that the plows may be released in succession the cams 38 of the respective wheels are angularly advanced an equal distance to cover the remaining half circle or circumference of the wheels 32, which cams thus correspond in position to the teeth on the same wheel and being diametrically opposite thereto. Thus, to release the plows and allow the same to drop, the shaft 30 is turned a half revolution and the lock pins 35 are disengaged by the cams in succession, and the plow units drop successively to the ground.

For driving the shaft 30 it is geared to the axle of the wheel 12, the gearing including a clutch or trip device controlled by the operator. The axle of the main wheel is connected by a chain belt 40 and sprocket wheels 41 and 42 to a cross shaft 43 which has at its outer end a sprocket 44 loose thereon. This sprocket is connected by a chain belt 45 to a sprocket 46 fast on the outer end of a shaft 47 the inner end of which has thereon a bevel gear 48 meshing with a spur gear 49 on the shaft 30. The shafts are supported in suitable bearing brackets on the main frame. At its extreme outer end the shaft 43 has a fixed cross bar 50, fastened to the shaft at the middle, and having at its opposite ends two small rollers 51 arranged to hit or miss a projection 52 at the inner end of a lever 53 which is pivoted at 54 to the wheel 44. A spring 55 tends to swing the lever 53 so as to bring the projection 52 in the line of movement of the rollers 51. Said projection is normally held out of said line of movement by means of a trip lever 56 which is pivoted to a bracket 57 on the frame 7 and which projects at its free end in position to strike the outer end of the lever 53 and turn the same so that the rollers 51 will pass the shoulder or projection 52. The trip lever or arm 56 thus normally acts as a stop for the lever 53, but when the cord 57' is pulled the arm 56 is swung out and the spring 55 turns the lever 53 so that its inner end will receive the contact of one of the rollers 51 and thereby lock the shaft 43 to the wheel 44, causing said wheel to turn and driving the shafts 47 and 30. The cord 57' will be extended over suitable guide pulleys to the operator on the traction engine, or otherwise, as desired. In order to disengage the coupling thus effected at the end of each revolution, a pitman 58 is connected to the wheel 46 and to the stop lever 56. This pitman is provided with a spring 59 in the middle to cushion its operation and to allow the trip lever 56 to be pulled back by the operator. After the cord 57' is released the turn of the wheel 46 will, in consequence of the pitman connection, return said stop lever to its original position at the end of one revolution of the wheel 46, and in such position the outer end of the lever 53 will strike and stop against the arm 56, and the lever 53 will swing on its pivot, disengaging its head or projection 52 from the roller 51, thereby disconnecting the sprocket 44 from the shaft 43 and stopping the sprocket which, as stated, is loose on the shaft. The parts are so proportioned that one turn of the sprocket 44 will produce a half turn of the shaft 30. Hence, to lift the plows, the cord 57' is pulled, and to drop the same the cord 57' is pulled again, when they will be successively dropped by the means and in the manner above described.

It is believed that the construction and operation will be fully understood from the above description. No limitation is implied by reason of the particular structure shown, since various modifications may be made within the scope of the invention. It will of course be appreciated that a traction engine or some other form of traction power will be connected to the front bar of the frame, a coupling member 60 being shown for that purpose.

I claim:

1. In a gang plow, the combination of a main frame, a wheel on which it is mounted, a series of plows arranged diagonally and connected to the frame, and means to successively lift or drop the plows, including a shaft geared to the wheel and extending diagonally in parallelism to the plows, and a hoisting device for each plow, operatively connected to the shaft.

2. In a gang plow, the combination of a main frame, a series of plows arranged diagonally and connected to the frame, and means to successively lift or drop the plows, including a shaft extending diagonally in parallelism to the plows, a hoisting device for each plow, and means between the shaft and the hoisting devices to operate the latter successively, including gearing proportioned to the distance apart of the plows in the line of draft, whereby the plows will be lifted or dropped in a straight line at the end or beginning of the furrows.

3. In a gang plow, the combination of a main frame, a series of plows arranged diagonally and connected to the frame, a hoisting device for each plow, mounted on the frame, and including a pinion, a shaft extending across the frame and having a series of segment gear wheels thereon corresponding to the pinions, the respective segment gears being arranged in succession circumferentially, so as to engage and operate the respective pinions in succession, and thereby lift the plows in succession, means to release the hoisting devices and drop the plows, and means to operate the shaft when desired.

4. In a plow, the combination of a frame, a plow pivotally connected thereto, a hoisting device on the frame, connected to the plow to lift the same, and including a pinion and a latch arranged to engage said pinion and lock the same to hold the plow in raised position, a shaft on the frame, a wheel on the shaft having a segment of teeth engageable with the pinion to turn the same and operate the hoist, and also having a cam arranged to strike and release the latch, to allow the plow to drop, and means to operate the shaft.

5. In a gang plow, the combination of a frame, a series of plows arranged diagonally and connected thereto, a series of hoisting devices on the frame, connected respectively to the plows to lift the same, and each including a pinion and a latch engageable therewith to lock the same and hold the plow in raised position, a shaft extending across the frame beside the hoisting devices, a series of wheels on the shaft, each wheel having a segment of teeth engageable with the pinion of the corresponding hoisting device to turn said pinion and operate the hoist, and each wheel also having a device constructed to engage and release the latch, to allow the plow to drop, the respective segments and devices on the wheels being angularly advanced to operate in succession, whereby the plows will be raised or lowered consecutively from the first plow of the gang to the last, and means to operate the shafts when desired.

6. In a plow, the combination of a frame, a wheel on which the frame is mounted, a plow connected to the frame, a hoisting mechanism mounted on the frame and connected to the plow, and means actuated by the wheel to operate the hoisting mechanism, including a shaft and gearing between the shaft and the wheel provided with a tripping device manually operated to operatively engage the gearing and automatically operated to disengage the same.

7. In a plow, the combination of a frame, a wheel on which the frame is mounted, a plow connected to the frame, a hoisting mechanism mounted on the frame and connected to the plow, and means actuated by the wheel to operate the hoisting mechanism, including shafts one of which is geared to the wheel, and the other to the hoisting mechanism, sprockets on said shafts, one sprocket being fast and the other loose, a belt connecting said sprockets, an arm carried by the shaft of the loose sprocket, a lever pivoted to the loose sprocket and having a projection engageable by the arm to drive the sprocket, a spring connected to said lever and tending to turn the same to engaging position, a manually released stop normally holding the lever in disengaged position, and means to automatically return the stop to disengage the lever, after said stop is manually released.

In testimony whereof, I affix my signature in presence of two witnesses.

CHARLES SMART.

Witnesses:
 A. M. ECKMANN,
 HERMAN HANSON.